C. G. THOMPSON.
Heating Stoves.

No. 139,035. Patented May 20, 1873.

Witnesses
Henry Orth
Colborne Brookes

Inventor
Charles G. Thompson
by R. S. & A. P. Lacey
his attys

C. G. THOMPSON.
Heating Stoves.

Patented May 20, 1873.

Witnesses
Benjamin C. Pole
Jmny Orth

Inventor
Charles G. Thompson
by R.S. & A.P. Lacey
his attys.

UNITED STATES PATENT OFFICE.

CHARLES G. THOMPSON, OF MEMPHIS, TENNESSEE, ASSIGNOR OF ONE-HALF HIS RIGHT TO ALBERT B. PUSH, OF SAME PLACE.

IMPROVEMENT IN HEATING-STOVES.

Specification forming part of Letters Patent No. 139,035, dated May 20, 1873; application filed February 7, 1873.

*To all whom it may concern:*

Be it known that I, CHARLES G. THOMPSON, of Memphis, in the county of Shelby and State of Tennessee, have invented certain new and useful Improvements in Cooking and Heating Stoves; and I do hereby declare that the following is a full, clear, and exact description thereof, that will enable others skilled in the art to which it appertains to make and use the same, reference being had to the accompanying drawing and to the letters of reference marked thereon, which form a part of this specification.

The object of my invention is to produce a stove which may be employed for heating and cooking purposes, or for either purpose separately.

In carrying out my invention, I arrange a grate or open fire-place around the lower part of a main cylinder, which is supported on a bed-plate, which rests on feet or standards, if required, and contains a channel or receptacle for the ashes dropped by the fire. The upper portion of the main cylinder is surrounded, or nearly surrounded, by a jacket or outer cylinder, which serves the double purpose of a flue and heater and extends down to within a short distance of the top of the grate and is provided at its lower end with an enlargement or mouth for the purpose of more effectually carrying off all gases arising from the fire. A chamber is formed over the upper end of the main cylinder, which communicates with the outer cylinder and with the pipe to the flue or chimney. In the upper part of this chamber holes or recesses are provided for the reception of cooking utensils. These holes are closed by dampers or slides. Two ovens are formed in the main cylinder, which may be employed for cooking purposes; or, when not so required, the main cylinder may be employed as a heated-air chamber by withdrawing slides or dampers in the base-plate in the bottoms of the ovens, and in a passage at the top of the apparatus.

But that my invention may be fully understood, I will proceed to describe the same more in detail by aid of the accompanying drawing.

Figure 1:
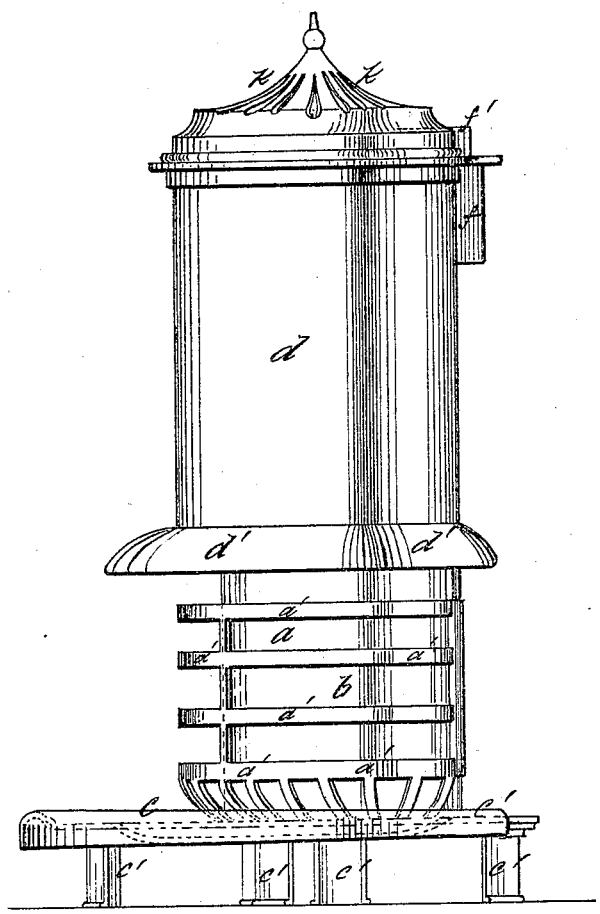
Figure 1 represents a perspective view, Fig. 2 a vertical section, and Fig. 3 a plan, of a stove arranged according to my invention.
Figure 2:
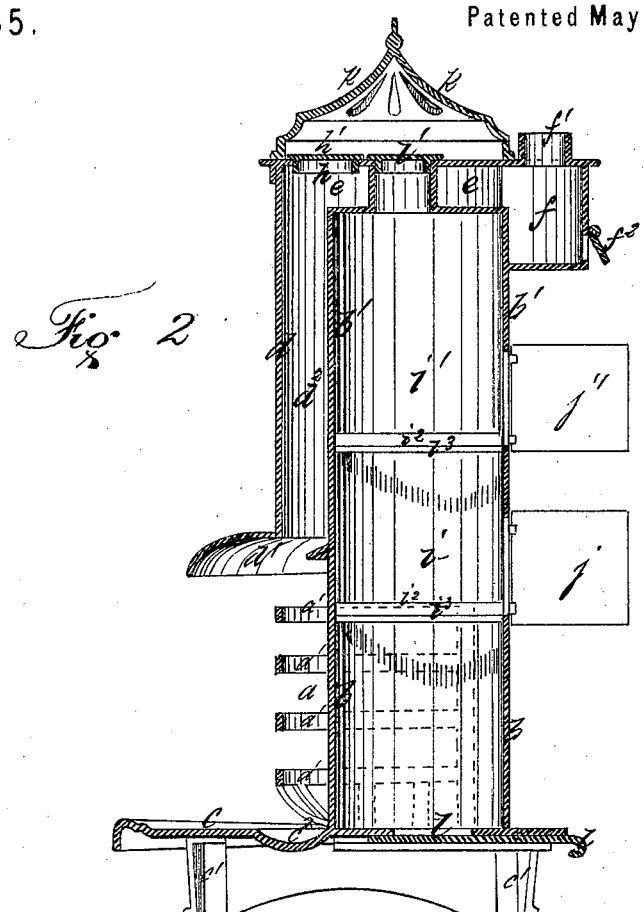
Figure 3:
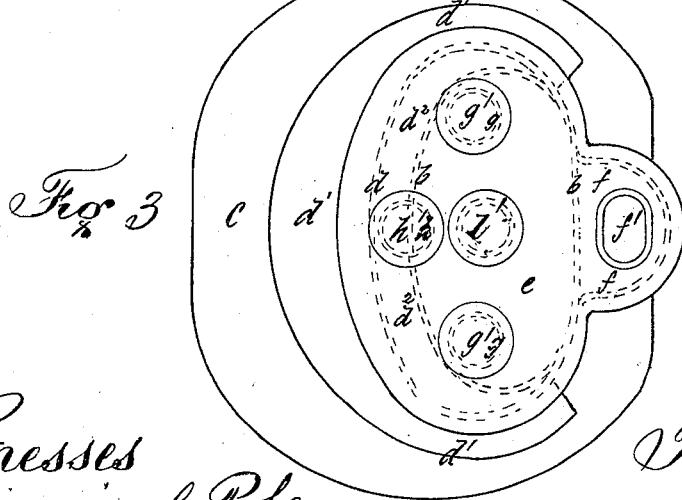

$a$ is the open grate, which is formed of bars $a^1$, supported by and affixed to the main cylinder $b$, which it nearly surrounds on the exterior. The main cylinder $b$ rests on a bed-plate, $c$, which is supported on legs or standards $c^1$, and is provided with a channel or receptacle, $c^2$, for the reception of the ashes dropped by the fire. The upper portion of $b^1$ of the main cylinder $b$ is nearly surrounded by a jacket, $d$, which extends down to within a short distance of the top of the grate $a$, as shown, and at its lower end it is provided with an enlargement or mouth, $d^1$, for the purpose of more effectually carrying off the gases arising from the fire. The chamber $d^2$, formed between the cylinder $b$ and the jacket $d$, serves as a flue for the purpose of carrying off the smoke as well as a heater. This chamber $d^2$, at its upper end, connects with a chamber, $e$, passing over the top of the main cylinder $b$ and connecting with a chamber, $f$, from which the pipe $f^1$ passes to the chimney or flue. $g$ and $h$ are holes for the reception of cooking utensils; these holes are closed, when not required, by lids or dampers $g^1$ $h^1$. $i$ and $i^1$ are ovens formed in the main cylinder $b$, which may be employed for cooking purposes. When these ovens, $i$ and $i^1$, are not required for cooking purposes the dampers $l$ and $l^1$, and also the damper or slides $i^2$ in the bottoms $i^3$ of the ovens $i^1$, are opened, thereby enabling the whole interior of the main cylinder $b$ to be employed as a heated-air chamber. $j$ $j^1$ are doors to give access to the ovens $i$ $i^1$. $f^2$ is an opening, closed by a door or slide, for the purpose of cleaning the flue. $k$ is an ornamental cover or dome, which may be employed when the stove is simply required for heating purposes.

The back of the grate $a$ may be formed of cast-iron, fire-clay, or other suitable material.

The grate may be also capable of removal, and this arrangement of stove may be furnished with grates adapted to burning wood, coal, or other materials.

In place of employing two ovens, one or any other number may be employed.

Having thus described my invention, I would have it understood that what I claim, and desire to secure by Letters Patent, is—

1. The combination of the grate $a$, main cylinder or chamber $b$, bed-plate $c$, external jacket $d$, enlargement or mouth $d^1$, and chamber or passages $d^2$, $e$, and $f$, substantially as and for the purposes described and set forth.

2. In a heating and cooking stove, the combination of an external grate, $a$, main cylinder or chamber $b$, bed-plate $c$, external jacket $d$, enlargement or mouth $d^1$, chambers $d^2$, $e$, and $f$, ovens $i$ $i^1$, dampers or slides $i^3$, $l$, and $l^1$, and doors $j$ and $j^1$, all arranged and constructed substantially as and for the purposes specified.

In testimony that I claim the foregoing I have hereunto set my hand this 4th day of January, 1873.

CHAS. G. THOMPSON.

Witnesses:
JOHN T. ELLIOTT,
JOHN CRONIN.